(12) United States Patent
Yao et al.

(10) Patent No.: US 7,675,022 B2
(45) Date of Patent: Mar. 9, 2010

(54) REFLECTING OPTICAL TRACE DETECTING MODULE HAVING AN OPTICAL PATH DIVERTING ELEMENT

(75) Inventors: Yu-Lung Yao, Taipei County (TW); Chien-Mo Lai, Taipei County (TW)

(73) Assignee: KYE Systems Corp., San Chung, Taipei (TW)

( * ) Notice: Subject to any disclaimer, the term of this patent is extended or adjusted under 35 U.S.C. 154(b) by 0 days.

(21) Appl. No.: 12/289,107

(22) Filed: Oct. 21, 2008

(65) Prior Publication Data

US 2009/0289177 A1    Nov. 26, 2009

(30) Foreign Application Priority Data

May 21, 2008   (TW) .............................. 97118799 A

(51) Int. Cl.
*H01J 40/14*   (2006.01)

(52) U.S. Cl. ....................................... 250/221; 250/239

(58) Field of Classification Search .................. 250/221, 250/216, 239; 345/157–167; 356/71, 73, 356/73.1
See application file for complete search history.

(56) References Cited

U.S. PATENT DOCUMENTS 6,707,027 B2 *   3/2004   Liess et al. ................... 250/221

* cited by examiner

*Primary Examiner*—Que T Le
(74) *Attorney, Agent, or Firm*—Bacon & Thomas, PLLC

(57) ABSTRACT

An optical trace detecting module includes a light-pervious plate, a light source, an optical sensor, an imaging lens, and an optical path diverting element. The light-pervious plate contacts an object and allows the object to move on a surface thereof. The imaging lens is disposed between the light-pervious plate and the optical sensor. The optical path diverting element is disposed between the imaging lens and the optical sensor. A sensing light projected from the light source is refracted to the optical sensor under the guide of the optical path diverting element.

6 Claims, 2 Drawing Sheets

REFLECTING OPTICAL TRACE DETECTING MODULE HAVING AN OPTICAL PATH DIVERTING ELEMENT

CROSS-REFERENCE TO RELATED APPLICATIONS

This non-provisional application claims priority under 35 U.S.C. § 119(a) on Patent Application No(s). 097118799 filed in Taiwan, R.O.C. on May 21, 2008 the entire contents of which are hereby incorporated by reference.

BACKGROUND OF THE INVENTION

1. Field of Invention

The present invention relates to a trace detecting sensor, and more particularly, to an optical trace detecting module with an optical path diverting element.

2. Related Art

With the development and progress of science and technology, computer equipments, no matter the personal computers (PCs) or notebooks, have become indispensable tools for providing convenience in people's daily life or work. However, window interfaces of the computer equipments can only be manipulated through pointing input devices, such as a mouse, touchpad, and trackball.

For example, in an optical mouse, an optical sensor module mounted on the bottom projects a light. The light is refracted at the surface of an object into an optical sensor of the optical sensor module, so as to detect a change of the light refracted by the surface of the object, and generate a corresponding cursor movement signal.

In recent years, a touch control module capable of manipulating a cursor and executing a preset function is further developed to completely replace the functions of the optical sensor module and buttons of a conventional mouse. The touch control module is disposed in an upper housing of the mouse. A user may selectively manipulate the position of the cursor through the optical sensor module on the bottom of the mouse or slide a finger on the touch control module to generate a corresponding control signal.

The optical elements of the conventional touch control module are stacked to form a complete optical path. Therefore, a projection distance between a light projecting diode (LED) and the optical sensor has to be relatively elongated, such that a light from the LED may be accurately refracted into the optical sensor. However, as a result, the touch control module must occupy more space, and accordingly, an electronic device installed with the touch control module is unable to be thinned due to its greatly increased volume, thus deviating from the current requirements of a light, thin, short, and small electronic device. In addition, in the manufacturing, the layout of the components and the touch control module inside the mouse must be considered, such that the manufacturing processes are increased.

SUMMARY OF THE INVENTION

Accordingly, the present invention is directed to an optical track sensor module, so as to solve the problems that the conventional touch control module occupies an excessively large space and is difficult to be thinned, the mouse is too bulky in size, and the assembly is too complicated.

An optical track sensor module includes a light-pervious plate, a light source, an optical sensor, an imaging lens, and an optical path diverting element. The light-pervious plate contacts an object and allows the object to move on a surface thereof. The imaging lens is disposed between the light-pervious plate and the optical sensor. The optical path diverting element is disposed between the imaging lens and the optical sensor. The light source projects a sensing light to the light-pervious plate, and the object reflects the light to the imaging lens to be imaged. Then, the reflected light is projected onto the optical path diverting element, refracted to the optical sensor under the guide of the optical path diverting element, and absorbed by the optical sensor.

The present invention achieves the following efficacy. The refraction path of the light is changed by the optical path diverting element, so that an optical path between the light source and the optical sensor does not need to be designed too long, thus reducing the overall height of the optical track sensor module and achieving the purpose of thinning.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The optical track sensor module provided by the present invention is applicable to a computer input device, including, but not limited to, a computer peripheral input device such as a mouse, trackball, or game controller. In the following detailed description of the present invention, the mouse is taken as the most preferred embodiment. The accompanied drawings are for reference and illustration only, instead of limiting the present invention.

Figure 1:
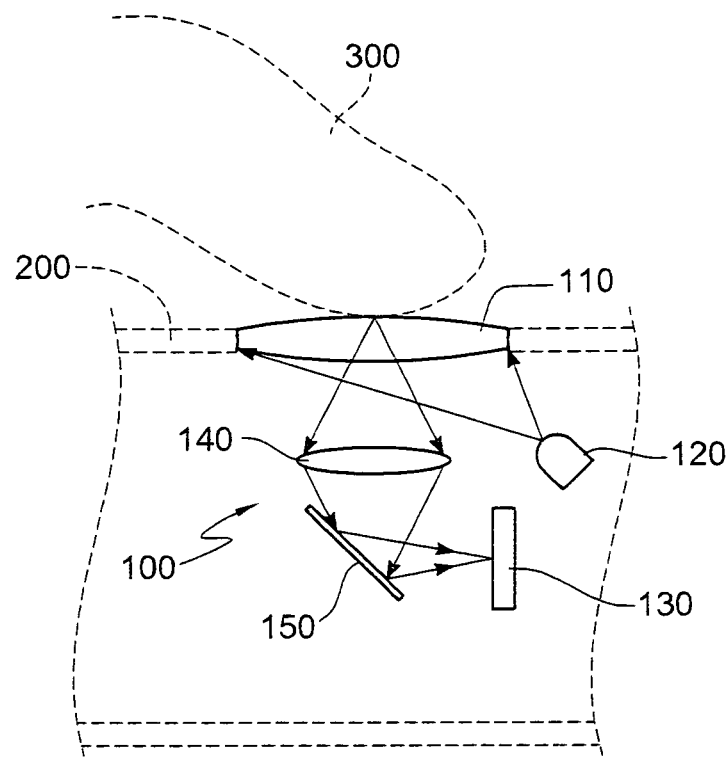
FIG. 1 is a schematic view of a first embodiment of the present invention.

FIG. 1 is a schematic view of a first embodiment of the present invention. An optical trace detecting module 100 of the present invention is installed in a computer input device 200, and includes a light-pervious plate 110, a light source 120, an optical sensor 130, an imaging lens 140, and an optical path diverting element 150. The light-pervious plate 110 is mounted on a housing of the computer input device 200, so as to contact an object 300 (for example, a finger of a user) and allow the object 300 to move on a surface thereof. Thereby, the optical sensor 130 senses a reflected light of the object 300, so as to calculate the movement of the object and generate a corresponding control signal. The imaging lens 140 is disposed between the light-pervious plate 110 and the optical sensor 130. The optical path diverting element 150 is disposed between the imaging lens 140 and the optical sensor 130, and upon actual requirements, an angle of the optical path diverting element 150 can be adjusted to correspondingly alter a light projection angle of the light source 120.

The light-pervious plate 110 is a light transmissive board or a lens made of transparent plastics, acryl, glass, or other materials capable of preventing the sensing efficiency of the optical trace detecting module 100 from being reduced. In addition, the optical sensor 130 may be a charge coupled device (CCD) or a complementary metal-oxide semiconductor (CMOS), and the light source 120 may be an LED or any other light emitting element so as to project a directive light.

Further referring to FIG. 1, the optical path diverting element 150 in the first embodiment of the present invention is a reflecting mirror disposed between the imaging lens 140 and the optical sensor 130. The optical sensor 130 is corresponding to the optical path diverting element 150, and the light source 120 projects a light to the light-pervious plate 110. The light penetrates the light-pervious plate 110 and is projected out of the housing of the computer input device 200, so as to be projected onto the object 300 (i.e., the finger of the user) sliding on the light-pervious plate 110, and then reflected to the imaging lens 140. Next, the light is refracted to the optical path diverting element 150, and refracted to the optical sensor 130 under the guide of the optical path diverting element 150, so as to calculate a relative displacement between the object 300 and the optical trace detecting module 100, and then generate a displacement control signal. The sensing light from the light source 120 changes its refraction path through the optical path diverting element 150, so that the overall height of the optical trace detecting module 100 is lowered, and the volume of the computer input device 200 is also reduced.

The present invention further adjusts a relative distance between the light-pervious plate 110 and the imaging lens 140, so as to correspondingly change the wavelength of the light projected by the light source 120 according to different colors of the light projected by the light source 120. In addition, the method of detecting and calculating a displacement of the optical trace detecting module 100 includes, but not limited to, an image detection mode or an optical refraction change detection mode, which will not be described in detail herein for not being the subject matter of the present invention.

Figure 2:
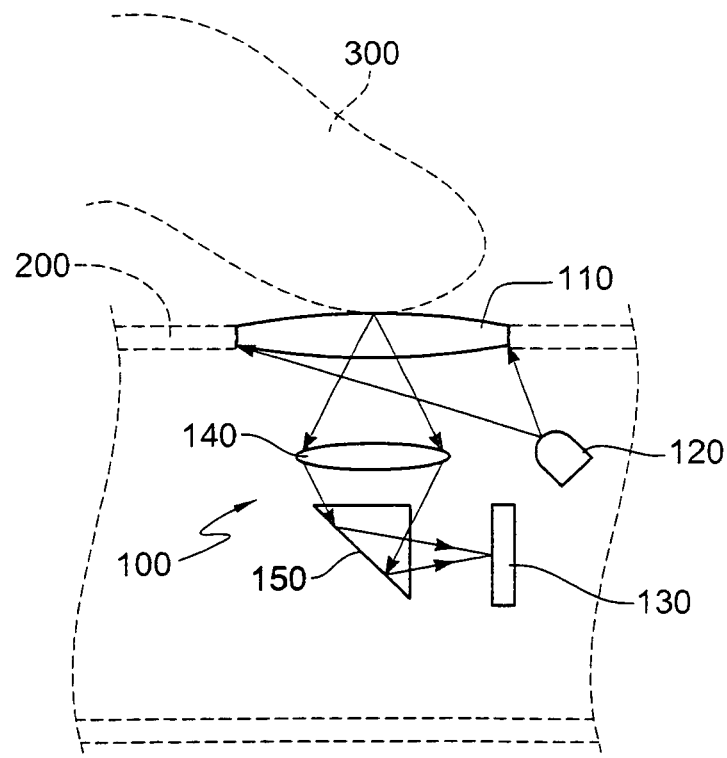
FIG. 2 is a schematic view of a second embodiment of the present invention.

FIG. 2 is a schematic view of a second embodiment of the present invention. As shown in FIG. 2, the optical path diverting element 150 of this embodiment is a reflecting prism disposed between the imaging lens 140 and the optical sensor 130. The light penetrating the imaging lens 140 is refracted to the optical path diverting element 150, and further refracted to the optical sensor 130 under the guide of the reflecting prism, so as to greatly reduce the overall height of the optical trace detecting module 100.

Figure 3:
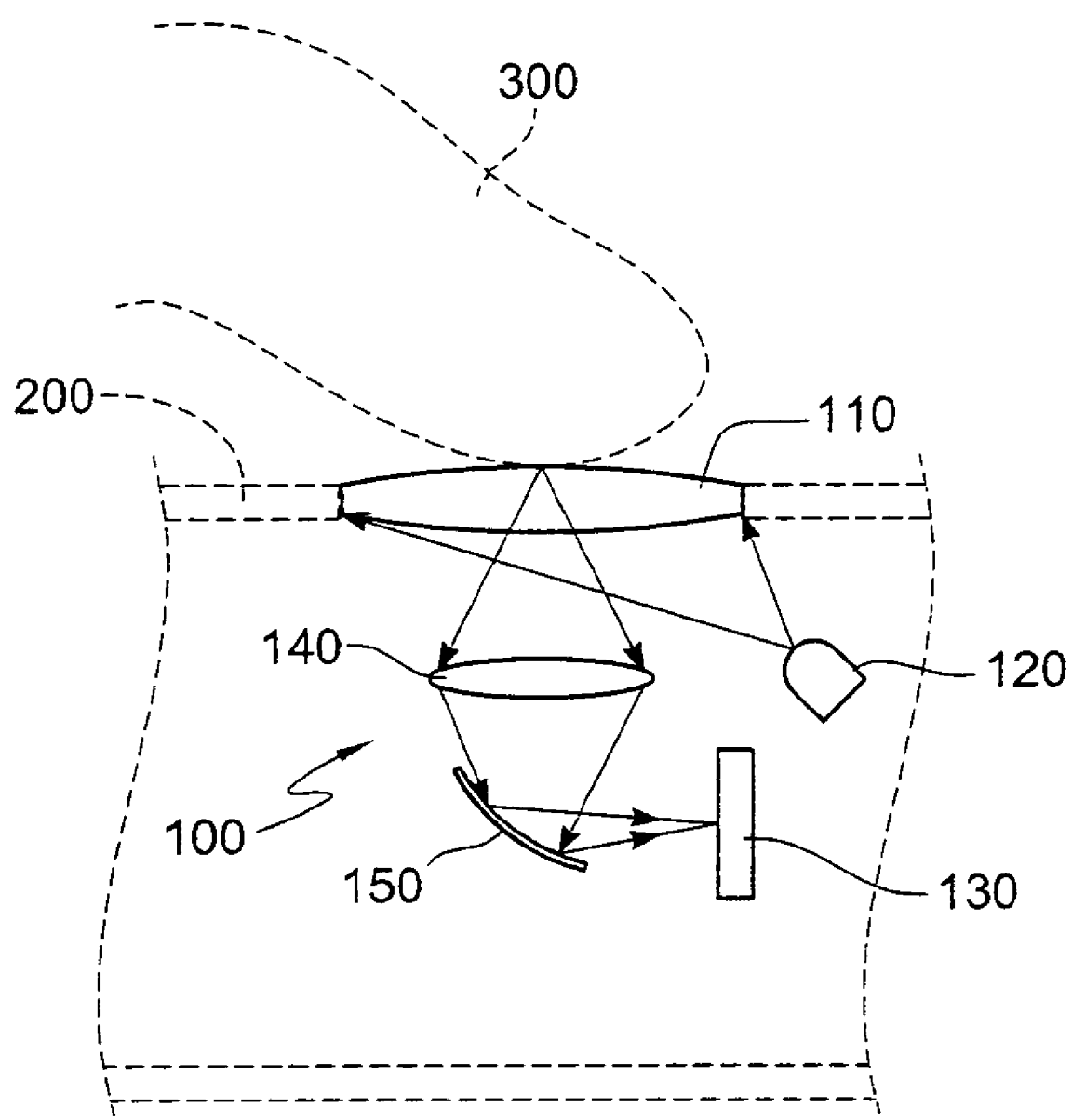
FIG. 3 is a schematic view of a third embodiment of the present invention.

FIG. 3 is a schematic view of a third embodiment of the present invention. The optical path diverting element 150 is a reflecting condenser. The reflecting surface of the reflecting condenser is a cambered surface or a curved surface, capable of not only guiding the light to be further focused on the optical sensor 130, but also converging the light penetrating the imaging lens 140 more efficiently, so as to enhance the sensing efficiency of the optical trace detecting module 100.

The optical path diverting element 150 may be any of those disclosed in the above embodiments. However, those skilled in the art may adopt different light guiding manners instead of being limited to the embodiments of the present invention.

In the present invention, the refraction path of the sensing light projected from the light source of the optical track sensor module is changed by the optical path diverting element, so as to reduce a necessary optical path between the light source and the optical sensor, thereby significantly reducing the overall height of the optical track sensor module and achieving the purpose of thinning.

In addition, the optical elements of the optical track sensor module in the present invention are not stacked, so that the whole height is reduced to achieve greater design flexibility in manufacturing. When the optical track sensor module is applied in a computer input device (for example, a mouse), the manufacturer may consider installing the optical track sensor module on a side edge or an upper housing of the main body of the mouse. Thereby, the computer input device is more diversified to satisfy various requirements of the consumer.

What is claimed is:

1. A reflecting optical trace detecting module, comprising:
   a light-pervious plate, for contacting an object and allowing the object to move on a surface thereof;
   a light source, for directly projecting a sensing light to the light-pervious plate;
   an optical sensor, for receiving a reflected light from the object;
   an imaging lens, disposed between the light-pervious plate and the optical sensor; and
   an optical path diverting element, disposed between the imaging lens and the optical sensor;
   wherein the light source projects the sensing light to the light-pervious plate, the object reflects the light to the imaging lens, then the optical path diverting element guides the reflected light to be further focused on the optical sensor, and the optical sensor senses the movement of the object and generates a corresponding control signal;
   wherein the optical sensor and the imagine lens are on different optical axes.

2. The reflecting optical trace detecting module according to claim 1, wherein the optical path diverting element is a reflecting mirror.

3. The reflecting optical trace detecting module according to claim 1, wherein the optical path diverting element is a reflecting prism.

4. The reflecting optical trace detecting module according to claim 1, wherein the optical path diverting element is a reflecting condenser.

5. The reflecting optical trace detecting module according to claim 4, wherein a reflecting surface of the reflecting condenser is a cambered surface or a curved surface.

6. The reflecting optical trace detecting module according to claim 1, wherein a distance from the light-pervious plate to the imaging lens is adjusted depending on a color of the light projected by the light source.

* * * * *